(12) United States Patent
Wong et al.

(10) Patent No.: US 8,817,795 B2
(45) Date of Patent: Aug. 26, 2014

(54) SYSTEM AND METHOD OF UTILIZING A FRAMEWORK FOR INFORMATION ROUTING IN LARGE-SCALE DISTRIBUTED SYSTEMS USING SWARM INTELLIGENCE

(75) Inventors: Wendy C. Wong, San Jose, CA (US); Meiyuan Zhao, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/389,252

(22) PCT Filed: Dec. 18, 2009

(86) PCT No.: PCT/US2009/068845
§ 371 (c)(1),
(2), (4) Date: Feb. 6, 2012

(87) PCT Pub. No.: WO2011/075150
PCT Pub. Date: Jun. 23, 2011

(65) Prior Publication Data
US 2012/0134361 A1 May 31, 2012

(51) Int. Cl.
*H04L 12/26* (2006.01)
(52) U.S. Cl.
USPC ...... 370/395.31; 370/392; 370/400; 370/409; 370/235; 370/236; 455/445
(58) Field of Classification Search
USPC ......... 370/235, 392, 409, 395.31, 236.2, 255, 370/400; 455/445
See application file for complete search history.

(56) References Cited

U.S. PATENT DOCUMENTS

| 8,018,953 | B1 * | 9/2011 | Zhao | 370/400 |
|---|---|---|---|---|
| 2006/0020516 | A1 | 1/2006 | Choi et al. | |
| 2006/0031576 | A1 * | 2/2006 | Canright | 709/240 |
| 2008/0162723 | A1 | 7/2008 | Zhao et al. | |
| 2010/0040070 | A1 * | 2/2010 | Suh et al. | 370/400 |
| 2010/0146585 | A1 * | 6/2010 | Li et al. | 726/1 |
| 2010/0166004 | A1 * | 7/2010 | Wang et al. | 370/401 |

FOREIGN PATENT DOCUMENTS

| JP | 2000-115255 A | 4/2000 |
|---|---|---|
| JP | 2002-064538 A | 2/2002 |
| KR | 1020040053728 A | 6/2004 |
| WO | 03107207 A1 | 12/2003 |
| WO | 2011075150 A1 | 6/2011 |

OTHER PUBLICATIONS

Office Action received for Korean Patent Application No. 10-2012-7013215, mailed on Aug. 26, 2013, 6 pages of Office Action including 3 pages of unofficial English translation.

(Continued)

*Primary Examiner* — Kibrom T Hailu
*Assistant Examiner* — Zewdu A Beyen
(74) *Attorney, Agent, or Firm* — Barnes & Thornburg, LLP

(57) ABSTRACT

In some embodiments, the invention involves information routing in networks, and, more specifically, to defining a framework using swarm intelligence and utilization of the defined framework for routing information in the network, especially for cloud computing applications. In an embodiment, information about available information/services is pushed to network nodes using information packets (ants). Nodes requiring services send query packets (ants) and a node may send a response to a query ant when information is available. Ants may be forwarded throughout the network based on popularity of nodes, freshness of information/requests, routing table information, and requests or interest by consumer nodes captured in information routing table. Other embodiments are described and claimed.

18 Claims, 12 Drawing Sheets

(56) References Cited

OTHER PUBLICATIONS

Extended European Search Report received for for European Patent Application No. 09852407.7, mailed on Sep. 18, 2013, 5 pages.

Hoh et al., "P2P File Sharing System over MANET based on Swarm Intelligence: A Cross-Layer Design," 2007 IEEE Wireless Communications and Networking Conference, 2007, pp. 2676-2681.

Huo et al., "ASDP: An Action-Based Service Discovery Protocol Using Ant Colony Algorithm in Wireless Sensor Networks," Mobile Ad-hoc and Sensor Networks, Lecture Notes in Computer Science, Dec. 12, 2007, pp. 338-349.

Zheng et al. "Ant-like courseware lookup in pervasive learning," ICCSE '09 4th International Conference on Computer Science & Education, Jul. 25, 2009, pp. 385-390.

PCT International Preliminary Report on Patentability received for International Application No. PCT/US2009/068845, mailed Jun. 28, 2012, 7 pages.

Office Action received for Japanese Patent Application No. 2012-539862, mailed Jun. 18, 2013, 2 pages of Japanese Office Action and 1 page of unofficial English translation.

PCT International Search Report, International Application No. PCT/US2009/068845, Aug. 27, 2010, 10 pages.

Bonabeau et al., Swarm Smarts, Scientific American, Inc., Mar. 2000, 8 pages.

Chavez et al., Challenger: A Multi-agent System for Distributed Resource Allocation, Autonomous Agents Group, 10 pages.

Caro et al., AntNet: Distributed Stigmergetic Control for Communications Networks, Journal of Artificial Intelligence Research 9 (1998) 317-365, AI Access Foundation and Morgan Kaufmann Publishers.

Schoonderwoerd et al., Ant-like Agents for Load Balancing in Telecommunications Networks, Agents '97 Marina del Rey, 1997, 8 pages.

Jiang et al., Ant-based Adaptive Trust Evidence Distribution in MANET, Proceedings of the 24th International Conference on Distributed Computing Systems Workshops (ICDCSW'04), 0-7695-2087-1/04, IEEE, 2004.

Official Communication received for European Patent Application No. 09852407.7, mailed on Oct. 7, 2013, 1 page.

Office Action received for Korean Patent Application No. 10-2013-7028484, mailed on Jan. 14, 2014, 5 pages of Korean Office Action including 4 pages of unofficial English translation.

Decision for Grant received for Japanese Patent Application No. 2012-539862, mailed on Nov. 12, 2013, 1 page of Japanese Decision for Grant and 1 page of partial unofficial English translation.

Office Action received for Korean Patent Application No. 10-2012-7013215. mailed on Feb. 25, 2014, 5 pages of Office Action including 2 pages of unofficial English translation.

* cited by examiner

| Providing Node Address | Capability Parameters | Provider Reputation | Last Update Timestamp | Probability Choosing this Node | Last Access Timestamp | Query Ant Source Node Address | Query Ant Creation Time | Performance Metric Requirements | Query Ant Arrival Time |
|---|---|---|---|---|---|---|---|---|---|
| | | | | | Information/service type $T_1$ | | | | |
| $x_1$ | $C\{x_1,T_1\}$ | $Rep\{x_1,T_1\}$ | $L\_update\_time\_T_1\_1$ | $Pr\{x_1,T_1\}$ | $L\_access\_time\_T_1$ | $S_1$ | $S\_T_1\_CTime$ | $C\{S_1,T_1\}$, $Rep\{S_1,T_1\}$ | $S\_T_1\_arrival\_Time$ |
| $x_2$ | $C\{x_2,T_1\}$ | $Rep\{x_2,T_1\}$ | $L\_update\_time\_T_1\_2$ | $Pr\{x_2,T_1\}$ | | $S_2$ | $S_2\_T_1\_CTime$ | $C\{S_2,T_1\}$, $Rep\{S_2,T_1\}$ | $S_2\_T_1\_arrival\_Time$ |
| ... | ... | ... | ... | ... | | ... | ... | ... | ... |
| | | | | | Information/service type $T_2$ | | | | |
| $x_3$ | $C\{x_3,T_2\}$ | $Rep\{x_3,T_2\}$ | $L\_update\_time\_T_2\_3$ | $Pr\{x_3,T_2\}$ | $L\_access\_time\_T_2$ | $S_3$ | $S\_T_2\_CTime$ | $C\{S_3,T_2\}$, $Rep\{S_3,T_2\}$ | $S\_T_2\_arrival\_Time$ |
| $x_4$ | $C\{x_4,T_2\}$ | $Rep\{x_4,T_2\}$ | $L\_update\_time\_T_2\_4$ | $Pr\{x_4,T_2\}$ | | $S_4$ | $S_4\_T_2\_CTime$ | $C\{S_4,T_2\}$, $Rep\{S_4,T_2\}$ | $S_4\_T_2\_arrival\_Time$ |
| ... | ... | ... | ... | ... | | ... | ... | ... | ... |
| | | | | | Information/service type $T_n$ | | | | |
| $x_5$ | $C\{x_5,T_n\}$ | $Rep\{x_5,T_n\}$ | $L\_update\_time\_T_n\_5$ | $Pr\{x_5,T_n\}$ | $L\_access\_time\_T_n$ | $S_5$ | $S_5\_T_n\_CTime$ | $C\{S_5,T_n\}$, $Rep\{S_5,T_n\}$ | $S_5\_T_n\_arrival\_Time$ |
| $x_6$ | $C\{x_6,T_n\}$ | $Rep\{x_6,T_n\}$ | $L\_update\_time\_T_n\_6$ | $Pr\{x_6,T_n\}$ | | $S_6$ | $S_6\_T_n\_CTime$ | $C\{S_6,T_n\}$, $Rep\{S_6,T_n\}$ | $S_6\_T_n\_arrival\_Time$ |

| Next Hop Node \ Destination | node 1 | | node 2 | | ... | node k | |
|---|---|---|---|---|---|---|---|
| | Probability | | Probability | | | Probability | |
| node A | Pr{A, node1} | | Pr{A, node2} | | ... | Pr{A, nodek} | |
| node B | Pr{B, node1} | | Pr{B, node2} | | ... | Pr{B, nodek} | |
| node C | Pr{C, node1} | | Pr{C, node2} | | ... | Pr{C, nodek} | |
| ... | | | | | | | |

| Next Hop Node \ Destination | node 1 | | node 2 | | ... | node k | |
|---|---|---|---|---|---|---|---|
| | Probability | Popularity measure | Probability | Popularity measure | ... | Probability | Popularity measure |
| node A | Pr{A, node1} | Counter(node1, Q) | Pr{A, node2} | Counter(node2, Q) | ... | Pr{A, nodek} | Counter(nodek, Q) |
| node B | Pr{B, node1} | | Pr{B, node2} | | ... | Pr{B, nodek} | |
| node C | Pr{C, node1} | | Pr{C, node2} | | ... | Pr{C, nodek} | |

(1011, 1007)

SYSTEM AND METHOD OF UTILIZING A FRAMEWORK FOR INFORMATION ROUTING IN LARGE-SCALE DISTRIBUTED SYSTEMS USING SWARM INTELLIGENCE

CROSS-REFERENCE TO RELATED U.S. PATENT APPLICATION

This application is a U.S. national counterpart application of international application serial no. PCT/US/2009/068845, which was filed on Dec. 18, 2009.

FIELD OF THE INVENTION

An embodiment of the present invention relates generally to information routing in networks (i.e., enable nodes to locate needed information quickly and nodes to disperse information to interested parties quickly in a distributed manner), and more specifically, to defining a framework using swarm intelligence and utilization of the defined framework for routing information in the network, especially for cloud computing applications.

BACKGROUND INFORMATION

In the new "Internet age," resources in the network (such as available services and information) can reside in many places. For instance, for server cloud computing applications, large number of data centers/servers collaborates to provide data storage/service/computational power to clients. The resource availability is dynamic due to the changing network condition, network activities, and applications. It is crucial to enable automatic management of these data centers/servers to respond quickly to and meet service requests workload, reliability, robustness, and performance requirements of clients. Moreover, services/information provided by servers/data centers is not homogeneous. Instead, there are rich and diverse. It can be very challenging to enable servers/data centers as well as clients to effectively manage such diverse information and track the dynamic information availability status. In a client cloud computing application where peer nodes collaborate together to both provide and consume service, there is the added complexity that client machines can be turned on and off in an unpredictable fashion. Hence, the resource management system must react fast enough to track the dynamic status of every node and update the rest of the network.

Various researches have been conducted in swarm based technology, in particular ant-based technology, has been used extensively to solve problems with distributed processing in networks. Existing network information/resource management systems propose to support information/resource distribution/retrieval in large-scale networks in a centralized and manual mode. Such systems require a server or a set of servers to manage network resource and the servers require consistent administrative effort to maintain their availability to clients. With ever growing size of the network, it becomes increasingly challenging to track and react to the dynamics of the network.

Researchers reported in both (1) Gianni Di Caro, Marco Dorigo, "Antnet: Distributed Stigmergetic Control for Communications Networks", Journal of Artificial Intelligence Research 9 (1998), P 317-365, and (2) Ruud Schoonderwoerd, Owen Holland, Janet Bruten and Leon Rothkrantz, "Ant-based load balancing in telecommunication networks", Adaptive Behavior, Vol 5, No 2, 1996, that the ant-based routing protocols are proven to generally support efficient routing in large-scale networks.

Currently, there is one swarm-based protocol described in: Tao Jiang and John S. Baras, "Ant-Based Adaptive Trust Evidence Distribution in MANET", Proceedings of the 24th International Conference on Distributed Computing Systems Workshops (ICDCSW'04), 2004. This paper (herein "Jiang et al.") provides ant-based information distribution. These authors use ant agents to retrieve certificates (as the trust evidence) from the mobile ad hoc networks (MANETs). Jiang et al. teach a system for directly searching for information that a node needs, rather than routing via a routing table. Instead the routing table is replaced with an information routing table using key words to look for specific information. The only information to be searched is a certificate, indexed by the target entity.

BRIEF DESCRIPTION OF THE DRAWINGS

The features and advantages of the present invention will become apparent from the following detailed description of the present invention in which:

FIG. 8 is an exemplary information routing table showing additional information to facilitate propagating information/services to nodes throughout the network, according to an embodiment of the invention;

FIGS. 10A-B represent routing tables with additional elements to indicate probability and popularity measures, according to an embodiment of the invention;

DETAILED DESCRIPTION

Figure 1:
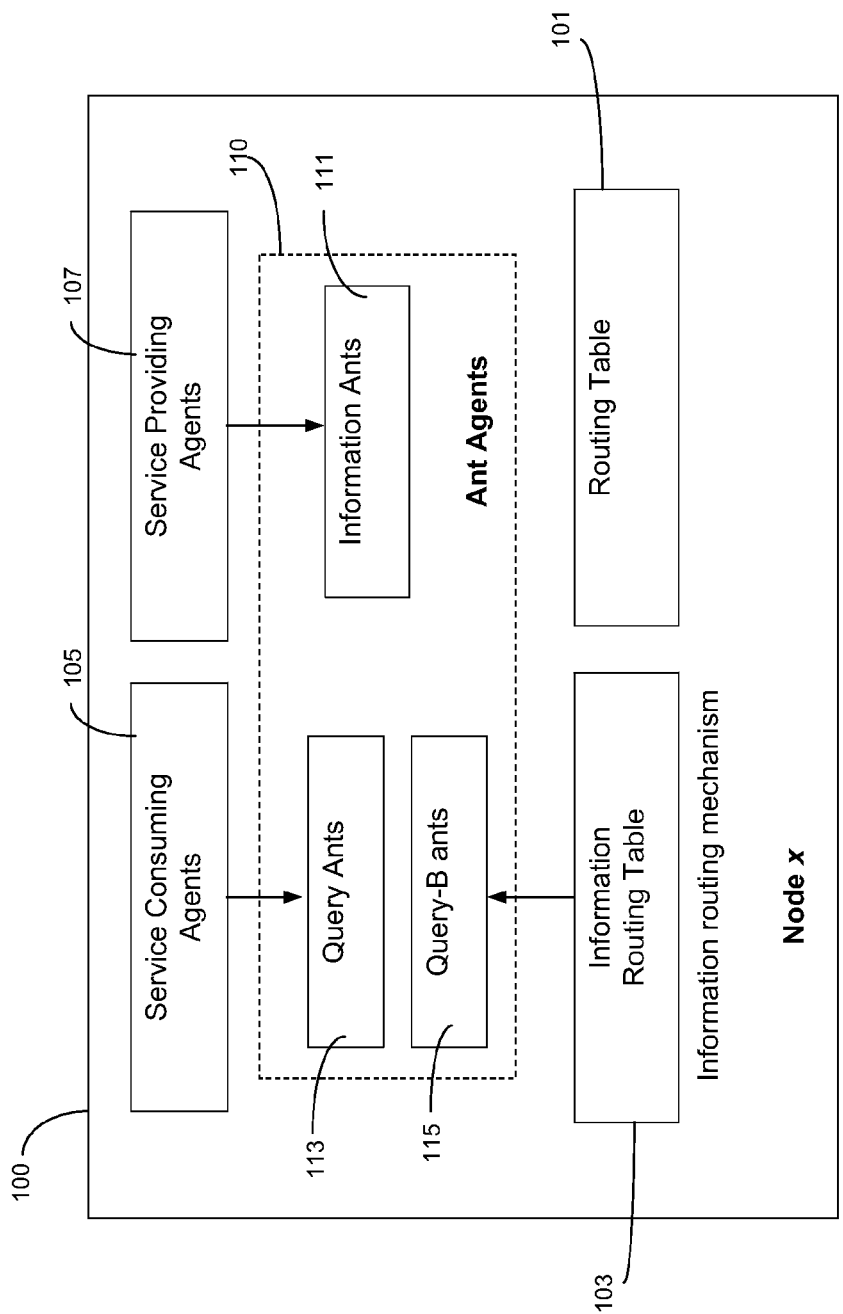
FIG. 1 is a block diagram of basic components found in network nodes to provide an ant-based information distribution network, according to an embodiment of the invention.

An embodiment of the present invention is a system and method relating to using swarm intelligence to enable cloud computing in networks by bringing clients needing data storage/computing resource and data centers that can provide the needed data storage/computing resource together. The Jiang et al. protocol has several problems, which are addressed by embodiments of the present invention. Jiang et al. supports only a single type of information: certificates. Their solution only works for a specific problem whereas embodiments of the present invention provide a flexible framework to accommodate multiple types of information. Moreover, their protocol doesn't utilize other sources of data, such as connection information, routing table updates, and aging information to facilitate the management of information tables, as is provided in embodiments of the invention.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

For purposes of explanation, specific configurations and details are set forth in order to provide a thorough understanding of the present invention. However, it will be apparent to one of ordinary skill in the art that embodiments of the present invention may be practiced without the specific details presented herein. Furthermore, well-known features may be omitted or simplified in order not to obscure the present invention. Various examples may be given throughout this description. These are merely descriptions of specific embodiments of the invention. The scope of the invention is not limited to the examples given.

Existing centralized and manual information distribution/retrieval systems cannot support the information/resource distribution/retrieval in large-scale networks and satisfy robustness and reliability requirements by users. Embodiments of the present invention use ant-based approach to construct, maintain, and use information routing table to support information dissemination and retrieval. This offers several advantages, for instance, inherent robustness and a fault tolerant nature. Due to the nature of ant-based routing, multiple destinations are naturally supported by the protocols described herein. Hence, if one destination fails due to equipment failure or malicious attack, there are multiple alternate destinations to choose from. Automatic network load balancing and traffic congestion avoidance are provided. The multiple destinations and probabilistic way of choosing a destination allow different destinations to be chosen and distribute traffic to different parts of the network. This scheme avoids traffic congestion. Diversity of information/service is supported. The information routing table is flexible to accommodate a rich set of information types that can be provided by the nodes in the network. Large-scale distributed networks can be supported. Effective tracking of changes in network dynamics is provided. Embodiments describe information routing table update mechanisms that can track network changes quickly by combining exploitation and exploration operations of artificial ants. Ants exploit popular nodes to receive more information and fast services. A popular node can be measured by the number of times it was chosen as the final destination node by packets over a time window. Meanwhile, ant agents randomly explore the network to discover any changes in the network quickly.

Embodiments of the invention propose a framework to support information dissemination for large-scale dynamic and distributed systems. The mechanisms proposed here may be applicable to multiple areas like cloud computing, client cloud computing, etc. Any application that requires large number of nodes to exchange, consume and provide information/service may apply the disclosed framework.

Various hereto unforeseen components and features of swarm-based computing are introduced herein. A framework is introduced to support management of diverse information in distributed systems. A probabilistic information routing table is introduced to organize information and facilitate information dissemination. An information routing table that is used to retrieve information from the network is also introduced. Mechanisms for fast update and management of the described information routing tables are introduced that include ant agents, node message exchanges, routing table updates, and aging mechanism.

Embodiments enable networks and services to have the following properties:

the network may have thousands of nodes;

the network may have very dynamic topology (e.g., nodes can join and leave networks quickly);

no central point(s) are required to control information distribution and retrieval;

there may be many different types of information offered by nodes in the network;

there may be multiple nodes serving the same type of the information or services; and information/service availability may be very dynamic (i.e., change quickly over time);

In addition, the solutions provided by embodiments of the invention may satisfy the following requirements:

effectiveness: updates on new information can be distributed to consumers quickly;

robustness: resilient to dynamic network changes; and efficiency: information routing table and mechanisms to manage information routing tables introduce relatively low overhead on each node and on the network.

Referring now to FIG. 1, there is shown a block diagram of basic components found in each node 100 that supports the described information routing framework, according to an embodiment of the invention. In an embodiment, routing table 101 provides information on how to reach other nodes in the network using node addresses. A low level routing mechanism is assumed to exist in a network node that requires the use of a routing table. The information routing table 103 is the core of the disclosed information routing framework, which enables swarm-based intelligent information routing, according to embodiments of the invention. The information routing table 103 provides data availability information. A service consuming agent 105 uses the information routing table to locate and pull desired service and data from the network. A service providing agent 107 provides service to the network and advertises its services in the form of entries in the information routing tables of other nodes. These components will be described in more detail, below.

In an embodiment, the service consuming agents and service providing agents may utilize what is referred to as "ant" agents 110. The agents are referred to as "ants" because they tend to navigate the network as ants do in a yard. Ants are social insects which can be adaptive, decentralized, and robust problem solvers. Ants exploring a yard will leave pheromones to indicate where they have been. The ants communicate with one another through stigmery, i.e., indirect communication taking place among individuals through modifications induced in their environment, such as the pheromones. Ants can find a shortest path between two points through stigmery.

Ants choose paths with probabilities proportional to pheromone concentration; Ants on path of higher pheromone will be investigating the same area, e.g., exploitation. Ants using other paths will be exploring new areas, e.g., exploration.

In an embodiment, a framework is provided where an information routing table (IRT) may be used as the repository for information left by ant agents navigating the network. In other words, the IRT contains information akin to the pheromones left by ants in the real world. Query ants 113 may be used by a node to send out exploration ants into the network to look for required services or information. A response may be sent with a query-B ant 115. A node providing services or information may announce its availability with an information ant 111.

In large scale networks, each type of information/service may be provided by multiple nodes and each node can provide multiple types of information/service. An embodiment of the information routing table 103 is shown in more detail in FIG. 2.

Figure 2:
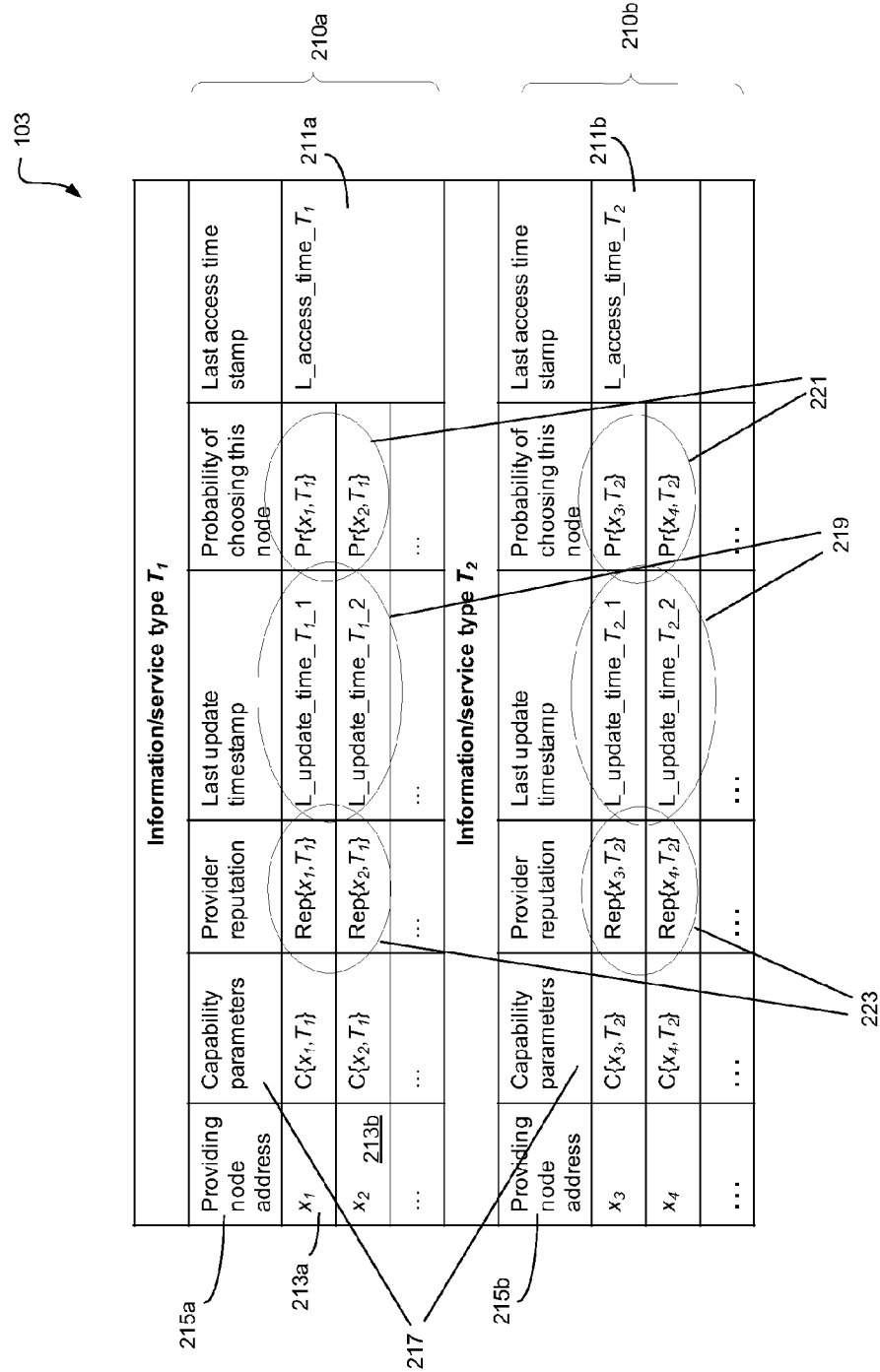
FIG. 2 is an exemplary information routing table identifying nodes providing information or services with specified capability parameters, according to an embodiment of the invention.

Characteristics of the information routing table are depicted as ranks of the multiple providing nodes by assigning them probability values. Referring to FIG. 2, the information routing table 103 contains the following entries: Information/service types (T) 210 that are of interest to the current node. T indexes the information/service types in the information routing table. For each information/service type $T_i$ 210, a last access timestamp 211 is used to record the last time this service type was accessed. The time stamp helps to determine whether $T_i$ is still of interest to the current node. For each information/service type $T_i$, the information routing table lists nodes 213 that provides $T_i$ and a description of the providing node in terms of:

$x_i$: address 215 of providing node;

$C(x_i, T_i)$: set of capability parameters 217 of providing node. Any metrics that quantify the node's capability may be defined here, for instance, computing power/memory size and computing power/memory size available for now, latency, cost, security level, etc.;

Rep $\{x_i, T_i\}$: Provider reputation 223 provides a measure of how reliable an information/service providing node is based on past transaction experience. The parameter may be calculated as a quotient over a moving time window, for instance, number of successful past transactions/total number of past transactions over time window. In addition, neighboring nodes may share this information among trusted nodes to provide more information. This may help a node quickly assign a provider reputation that it has never used before. For new information/service providing nodes, provider reputation may be set to 0.5 or another pre-determined rating.

Last update timestamp: the last update timestamp 219 records when the last time this entry was updated. The last update timestamp enables the current node to avoid updating this entry based on obsolete information.

Pr$\{x_i, T_i\}$: Probability 221 of choosing node $x_i$ for needed information/service among all nodes that provides same information/service.

Pr$\{x_i, T_i\}$ satisfies the following requirements:

$0 \leq \Pr\{x_j, T_i\} \leq 1$, $\Sigma_{x_j \in X_i} \Pr\{x_j, T_i\} = 1$, where $X_i = \{x_1, x_2, \ldots, x_m\}$ is the set of nodes that provide information type $T_i$. This probability is calculated as a function of node capabilities, provider reputation, last update/entry access information, etc. The IRT may not contain information of all nodes that provide information/service type $T_i$. Instead, a subset of such nodes may be chosen to be recorded in the IRT according to communication latency, cost, provider reputation and other metrics. This measure is taken to shorten the IRT and the search operation and to only record nodes that can provide information/service type $T_i$ fast, reliably, cheaply and safely. Nodes that have high capabilities, provider reputation or have been updated more recently will typically have higher probability values. The probability entries calculation is application specific and may vary. An exemplary method for calculating probability is described here, as illustration only.

As illustration, assume that the following metrics are used to describe how a potential service provider center is evaluated: (1) server processing power; (2) memory/storage capability; (3) provider reputation, (4) time duration of travel for packets traveling from service providing node to service consuming node; and (5) time value T: time the entry was last updated. Statistics are collected corresponding to the first four metrics mentioned, above, over a moving time window for T seconds, by a node. In embodiments, there may be more than four metrics. However, the same method applies, as discussed below.

First, each metric is processed before combining them into the final probability value. The following processing may be used to process all metrics except time value T:

First, the interval from the minimum and maximum is divided into N bins. Second, each bin is assigned a value measuring the preference of that bin. For example, if the focus is processing power, bins that contain high processing power will have a value that is higher than bins that contain lower processing powers.

For processing of metric values the following notations are used:

$P_{max}$ is the maximum server processing power and $P_{min}$ is the minimum processing power observed over the past T seconds either by information pushed by information ants or other means as discussed further below.

$P_{bin} = (P_{max} - P_{min})/\text{N\_P\_interval}$, where N_P_interval may be 10 or another number which divides the processing power into N_P_interval buckets from $P_{min}$ to $P_{max}$ with uniform sizes. Note that, the interval from $P_{min}$ to $P_{max}$ may be divided into buckets with various sizes too.

$M_{max}$ is the maximum storage and $M_{min}$ is the minimum storage size observed over the past T seconds.

$M_{bin} = (M_{max} - M_{min})/\text{N\_M\_interval}$, where N_M_interval may be 10 or another number which divides the storage capability into N_M_interval buckets from $M_{min}$ to $M_{max}$ with uniform sizes (or variable size).

$T_{max}$ is the maximum time duration of travel and $T_{min}$ is the minimum time duration of travel by packets observed over the past T seconds.

$T_{bin} = (T_{max} - T_{min})/\text{N\_T\_interval}$, where N_T_interval may be 10 or another number which divides the time duration of travel into N_T_interval buckets from $T_{min}$ to $T_{max}$ with uniform sizes (or variable size).

$\text{Rep}_{max}$ is the maximum provider reputation and $\text{Rep}_{min}$ is the minimum provider reputation for the various information/service providers that have been observed over the past T seconds.

$\text{Rep}_{bin} = (\text{Rep}_{max} - \text{Rep}_{min})/\text{N\_Rep\_interval}$, where N_Rep_interval may be 10 or another number which divides the time duration of travel into N_Rep_interval buckets from $\text{Rep}_{min}$ to $\text{Rep}_{max}$ with uniform sizes (or variable size).

Figure 3:
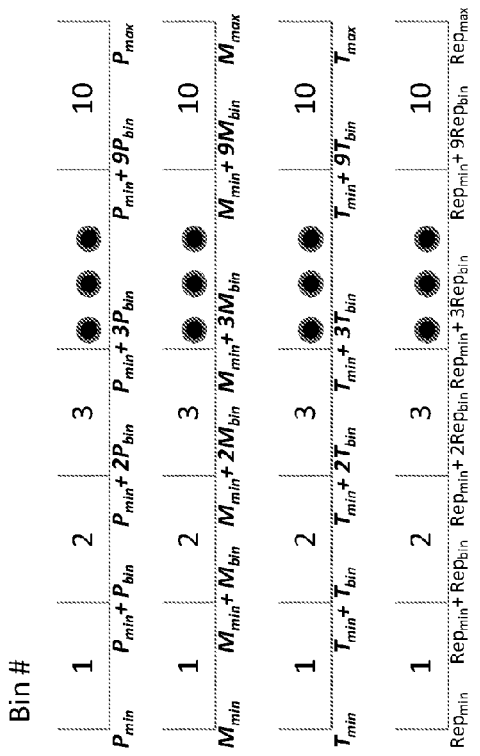
FIGS. 3-6 are representative illustrations of how bins may be used to assign probability information.
Figure 4:
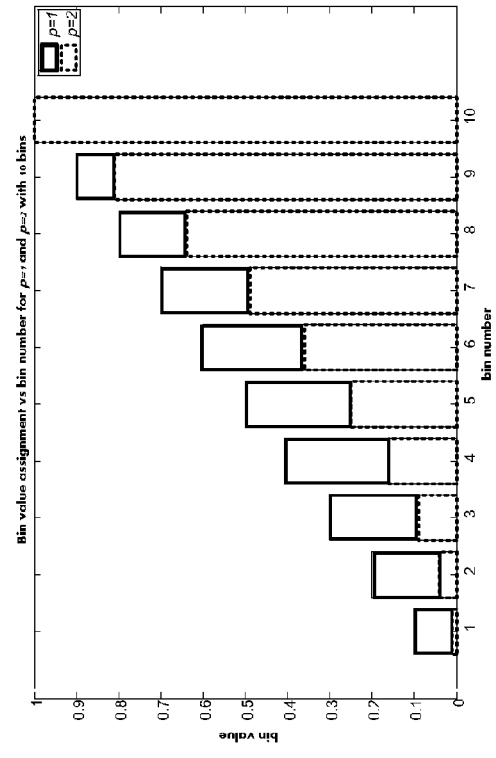

A bin number is assigned to each bin depicted in FIG. 3. Each bin is assigned a value. For processing power, storage size and reputation, the following function may be used to assign a value to each of its bin:

Bin value=(bin # times bin width)$^p$/(N_p_interval or N_M_interval or N_Rep_interval times bin width)$^p$ and p>0 where the bin value for p=1 and 2 can be found in FIG. 4.

Figure 5:
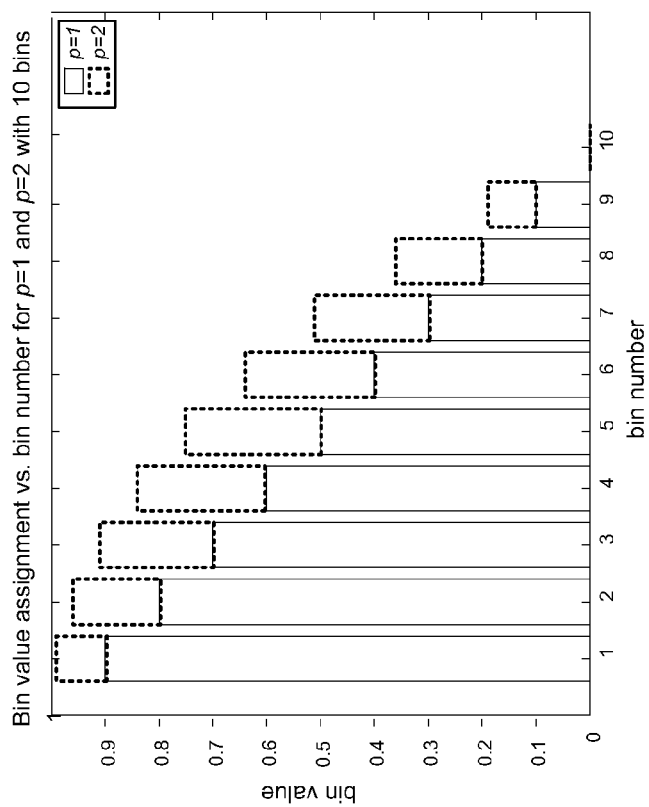

For time duration (or other metric where a smaller number is preferred), the bin value assignment may be:

Bin value=1-(bin #)$^p$/(N_T_interval)$^p$ and p>0 where the bin value for p=1 and 2 can be found in FIG. 5.

Note that when p>1, the higher bin numbers tend to be rewarded (lower bin numbers for time duration) more.

Figure 6:
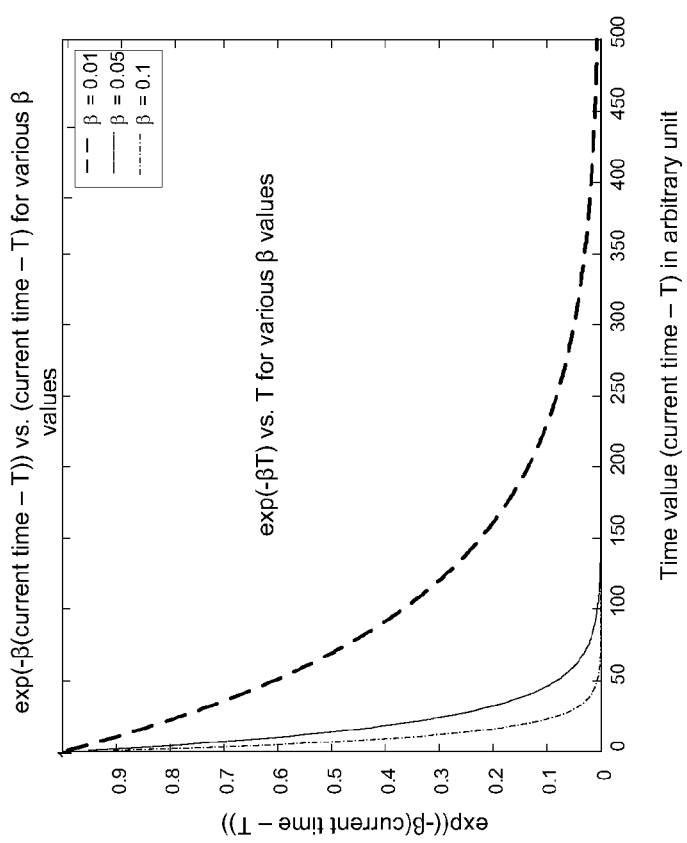

In an embodiment, the following method may be used to combine all the metrics into one:

Value=($\alpha_1$*processing power bin value+$\alpha_2$*storage size bin value+$\alpha_3$*provider reputation bin value+$\alpha_4$*time duration bin value)*exp(-$\beta$(current time-T)), where the sum of all α's=1. The exact value of α's depend on how important that particular metric is. For example, for nodes with applications that are time sensitive, $\alpha_4$ may be set to 0.5 while $\alpha_1$=0.05, $\alpha_2$=0.05 and $\alpha_3$=0.4. On the other hand, β controls how much the probability will degrade due to aging (an entry not being updated recently). FIG. 6 captures the effect of β value on exp(-β*(current time-T)) values. Note that the higher the β value, the faster the drop off in exp(-β*(current time-T)).

Now, the final probability values may be determined. For illustration, assume that for service type $T_1$, there are five (5) entries, so there will be five values: Value_1, Value_2, Value_3, Value_4 and Value_5. The final probability for the n-th entry may be calculated as:

Prob_n=Value_n/(Value_1+Value_2+Value_3+Value_4+Value_5). Other methods of probability calculation may be in used in an embodiment, for instance, to further weight a value.

When a node needs a certain information/service type $T_i$, the node examines its information routing table entries of nodes that provide service $T_i$. If no entry satisfies the node's performance metrics requirements, the service query fails. The node may invoke the information query process as discussed further below to actively search for an information/service on the network. If there is at least one entry in the information routing table that satisfies the node's performance metrics requirements for an application, the operations below may be performed to normalize the probabilities for nodes that meet the performance metrics requirements. This operation is performed to enable an information/service providing node to be chosen among all the eligible nodes that provide the same service. Whenever a query for information/service $T_i$ is generated, L_access_time_$T_i$ in the information routing table for the information/service $T_i$ will first be updated. Next, the probabilities for those entries meeting the performance metrics requirements should be normalized as follows.

All providing nodes are collected that satisfy the performance metrics requirement of the current service request into a set $X'_i$ and $X'_i \subseteq X_i$, where $X_i = \{x_1, x_2, \ldots, x_m\}$ is the set of nodes that provide information type $T_i$. Hence, for each node x, $x \in X'_i$ if and only if (iff) x satisfies the performance metrics requirement of the current service request.

The probability for each node $x \in X'_i$ may be normalized as follows:

$$Pr(x, T_i)^{normalized} = \frac{Pr(x, T_i)}{\sum_{x_k \in X'_i} Pr(x_k, T_i)}.$$

The serving node(s) may be selected randomly using $Pr(x, T_i)^{normalized}$ directly or a function of $Pr(x, T_i)^{normalized}$. A random number generator or other method may be used to randomly select the node using the calculated normalized probability. For instance, a random number generator generates a number between zero and one. If there are only two nodes a and b with probabilities equal to 0.25 and 0.75, respectively, then if the computed random number returned in 0.6, then node b is selected because the random number falls between 0.25 and 1.0. If the random number generated is 0.15, then node a is selected. Thus, the probabilities for the nodes are segregated into intervals of the range 0.0 to 1.0. A service request may then be sent to the selected node(s). Note that the actual selection criteria are application specific. There may be one or multiple nodes chosen to serve the current node. Unlike strict ranking numbers, using a probability approach can avoid traffic congestions that are created by all nodes seeking service from the same small set of top ranking providing nodes.

An embodiment provides several update mechanisms to update the information routing table in a node. An update mechanism that will be described later uses the swarm intelligence paradigm to effectively propagate and update information availability throughout the network. "Artificial ant agents" may be used to accomplish this goal. For instance, query ant agents may be used to pull information from the network. Information ant agents may be used to actively push new information/service or information/service updates to nodes needing the information/service.

In addition, the information routing table updates may be triggered by: (1) a service reply message from nodes that provide information/services; and/or (2) updated information from lower layer routing table; and/or (3) aging of information routing table entries.

Figure 7:
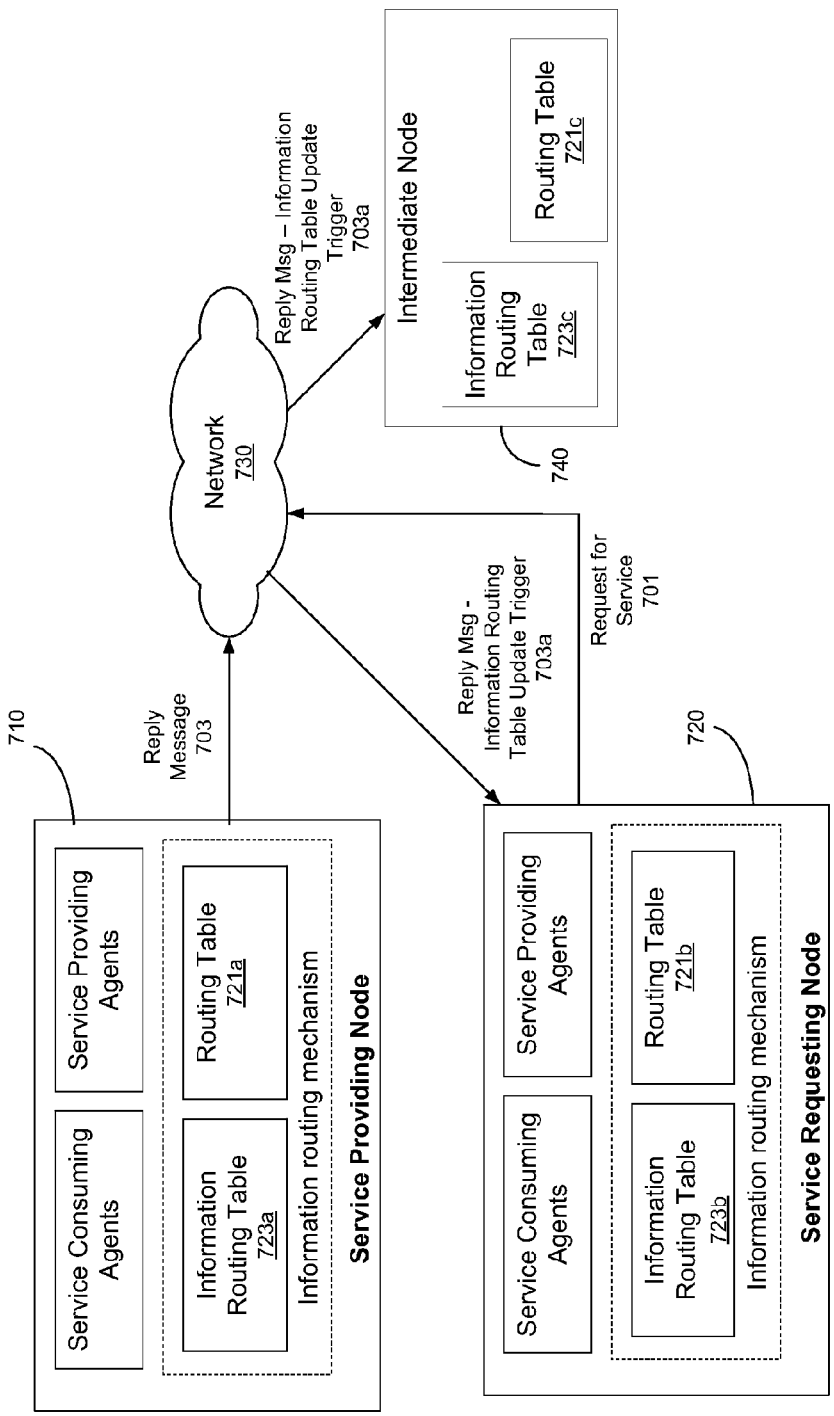
FIG. 7 is a block diagram of exemplary nodes on a network illustrating communication of query and query reply ants through the network, according to an embodiment of the invention.

Referring now to FIG. 7, there are shown exemplary nodes on a network illustrating communication of query and query-B reply ants through the network, according to an embodiment of the invention. The service providing node 710 may send a reply message 703 in response to a service request 701. When this reply message 703 travels through the network 730, it can trigger (703a) an information update of the information routing table 723 on each node it encounters during its trip back to the requesting node 720. The intermediate nodes 740 may either update the existing table entry or create a new entry to record the newly available service by the serving node. In addition, the probability values of all entries in the information routing table of the current node providing the same information/services will be updated and probability values recomputed to reflect the new update.

The routing table 721 is updated when there are changes in the network connectivity or topology. When a node becomes unreachable, it may be removed from the routing table of a node. An unreachable node will not be able to provide an information/service. Hence, when a node is removed from the routing table, it may be automatically removed from the information routing table 723 as well. The entries related to the unreachable node will be deleted in the information routing table 723 and the probability values of all remaining nodes providing the same information/services will be re-computed.

Old entries in an information routing table 723 may be obsolete and may not reflect current network/device conditions. In addition, an information/service type that has not been accessed for a period of time reflects low interest level in that information/service type. Because the probability entry update function takes into account the update timestamp, the probability entries of these old entries drop as they age. When their probability entries reach a low threshold, the entry may be removed from the information routing table as it become obsolete or not important/interesting anymore. The probability values of remaining entries of the same information/service types will by re-computed accordingly to reflect these changes. In addition, when an information/service type has not been accessed for a long time, exceeding some threshold reflected by access timestamp, the whole information/service type may be removed from the information routing table. This information/service type is then assumed to no longer be of interest to the node.

Information may be propagated through the network to nodes in a variety of ways. Some new entries for the routing table of the node are discussed above. An information routing table to assist in locating information/services on large-scale networks has also been discussed. An embodiment of the invention includes additional entries to the information routing tables to facilitate propagating information/services to nodes throughout the network.

FIG. 8 illustrates an exemplary information routing table with the addition of four (4) more fields for each existing information type or new information type $T_i$: (1) source node inquiring about service 801; (2) query ant creation time 807; (3) performance metrics requirement 803; and (4) query ant arrival time 805. The source node inquiring service 801 is the node address where a query ant (to be discussed later) is sent from. Query ant creation time is used to make sure the information routing table contains the most up-to-date information. When a new query ant from the same node carrying the same query arrives at a node with a more recent creation time, the existing entry will be updated with the information in the new query ant. The query ant will then be forwarded to a next new node. On the other hand, if the new arrival query ant is older, the query ant will be killed and not forwarded to a next new node. Performance metrics requirement 803 denotes the capacity requirements and provider reputation that are needed to satisfy the source node. Query ant arrival time 805 stores the time a query ant was received. Entries that have aged beyond a time limit may be deleted from the information routing table by comparing the difference between current time and the query ant arrival time.

The new entries 801, 803, 805 and 807 may be used by information ants to determine which node the information/service availability updates are to be sent.

Information ant agents may be used by a node to quickly propagate information/services it can provide to other nodes in the network. At each node, an information ant agent may be sent out to the network to propagate information corresponding to: (1) new information/services added due to new device joining the network; (2) significant changes in capability parameters occurring as load experiences change (capacity increase when needs are satisfied or capacity decrease when more new service requests are received); and (3) information/services deleted when device/nodes are shut down properly. In some embodiments, information ants may be sent at periodic intervals to keep information fresh, on the network.

In an embodiment, an information ant agent is comprised of the following format:
Information(D,S,T): {S||T||iCTime||D||PM{S,T}||hop||D_type_flag}, where D is the destination node where the information ant is to go, S is the source node address where information/services are available, T is the information type that is provided by a node, iCTime records the creation time an information ant associated with S and information type T, where S maintains a separate iCTime for each information type that the node produces. A batch of information ants for updating information of type T is generated using the same iCTime. Each time a new update is generated, the iCTime value is updated to the current time when the update is generated.

PM {S,T} contains the capability parameters, provider reputation of information type T provided at source node S.

hop is the hop count value that specifies the distance the information ant has traveled, so far. Upon initiation, hop=0.

D_type_flag specifies how the destination D of the information ant is set. In an embodiment, the D_type_flag may be set as follows.

If destination D is set using the information routing table, D_type_flag=S. This implies that destination D has actively queried about information type T in the past, and would probably be interested to receive updates on this information type in the future.

If destination D is set using the routing table, D_type_flag=P. This implies that destination D is chosen due to its popularity measure and may or may not be interested in information type T. Hence, a destination chosen in this manner may be changed in later hops to redirect the information ant to nodes that actually need the information update.

Figure 9:
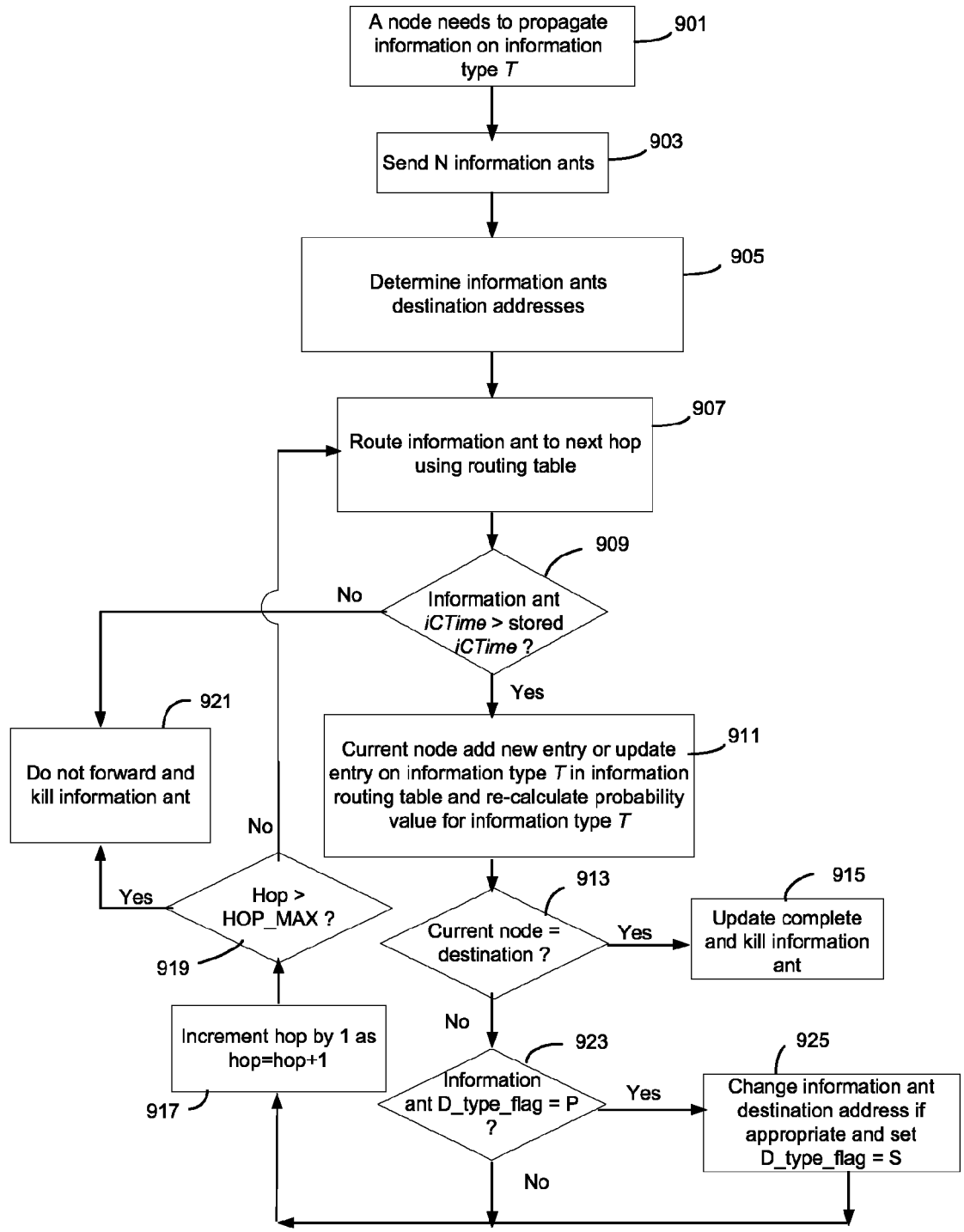
FIG. 9 is a flow diagram illustrating how a service/information providing node may propagate information throughout the network, according to an embodiment of the invention.

In an embodiment, a process as shown in FIG. 9 may be used to propagate information on a network. When a node starts or stops providing information type T, or the node's capability parameters on providing information type T have changed significantly, the node will commence propagating this information by sending out information ants in block 901.

N information ants are generated in block 903 in a format as described above. information($D_1$, S, T), information($D_2$, S, T), . . . , information($D_n$, S, T), where $D_1$, $D_2$, . . . , $D_n$ are destination nodes. It should be understood that each node may use a different value for N based on network congestion level estimation, urgency of update, interest level on the information type and etc. The destination nodes may be selected as follows, in block 905. If any information routing table contains source nodes that inquire about information type T with performance metrics parameters meeting or exceeding the source nodes' requirements then these source nodes are set as the destination addresses, and the D_type_flag=S. If there are more than N source nodes in the information routing table, the N most popular source nodes may be selected using the popularity measure in the routing table, where the D_type_flag=S. If there are fewer source nodes in the information routing table interested in the information type, the remaining information ants may be sent to the most popular nodes not already chosen in the routing table and set D_type_flag=P, indicating that those nodes did not specifically request the information as identified in the source, or intermediate node's information routing table. If no information is found in the information routing table, the destination nodes may be set to be the N most popular destinations in the routing table according to the popularity measure. If there are fewer than N destinations in the routing table, then the number of information ants may be reduced, or information ants may be sent to duplicated addresses. When sent to duplicate addresses, it will be understood that the information ant may be propagated through different parts of the network due to some randomness in the routing and re-routing by intermediate nodes, as discussed further below. Thus, the information may eventually reach more nodes than if no duplication is allowed.

Once the destination nodes are set for the information packets information(D,S,T), the information ants may be routed using the routing tables in block 907. At each hop, the receiver node of an information ant may take one of a number of actions. For illustration, if a node l is not directly connected by communication route to a destination node n, then the information must pass through at least one intermediate node m. The intermediate node m is identified in the routing table for node l.

In an embodiment, the intermediate node may change the ultimate destination address for the information ant, based on certain criteria. The destination address of an information ant may be changed if D_type_flag=P. Upon receiving an information ant information(D, S, T) with D_type_flag=P, the receiving node will examine its own information routing table. If a source node inquiring on information type T with performance metrics requirement met by C{S, T} and Rep{S, T} exists, the destination D may be switched to that new source node and set D_type_flag=S. If multiple source nodes exist, then the most popular source node may be selected as the destination. For multiple source nodes with the same popularity measure, a destination may be randomly selected.

The information ant is then forwarded to the destination node using the intermediate node's routing table.

The receiving node determines whether the information ant is fresh by comparing the stored iCTime for each {S, T} pair with the received iCTime value, at block 909. If the received iCTimevalue is smaller than or equal to the maintained iCTime value, as determined in block 909, the information ant is discarded, in block 921. Otherwise, the maintained iCTime is updated to the received value and information processing of the ant (information) continues.

A new entry, if necessary, or update of an existing entry in the information routing table, on information type T is performed with the information contained in the information ant, in block 911. The probability values for information type $T_i$ are then re-calculated and applied to the entry in the information routing table. If the receiving node is the destination node, as determined in block 913, then the update is complete and the information ant is "killed," e.g., not sent any further, in block 915. Otherwise the D_type_flag is checked to see if it indicates that the ant was routed due to a popularity measure, e.g., D_type_flag equal to P, in block 923.

If D_type_flag equal to P, as determined in block 923, then the information ant destination address may be changed and set D_type_flag to S in block 925, if appropriate, as described above. The hop count is incremented in block 917, and then checked to determine whether the hop count has exceeded a maximum threshold, in block 919. If the hop count has exceeded the maximum threshold, then the ant is killed, and no longer forwarded, in block 921. If the hop count has not been exceeded, then the information ant is routed to next hop using routing table, block 907, and the process continues until the destination node has been reached or the hop count exceeded the maximum threshold. When the hop count is exceeded, the ant is killed in block 921 and no longer forwarded.

A number of parameters in the network agents may be set to an initial value and then modified based on the performance of the network. For instance, N, the number of information ants to be generated for each information update may be decreased if the forwarding creates too much network traffic, or increased if nodes are not receiving the ants in a timely manner. A reasonable initial value may be Log(n) where n is the number of nodes reachable in the network, for some networks. The best choice for N will depend on network congestion level estimation, urgency of update, interest level on the information type, etc. HOP_MAX, the number of nodes traveled by information ants, may be modified to more effectively propagate information without over burdening the network resource. An initial value may be the number of hops to reach the farthest node, as determined by the routing table, i.e., the diameter of the network, or a fraction thereof.

The aforementioned publish/subscribe or push/pull distributed protocols allow nodes on the network to subscribe what information they want to consume. The nodes' subscription information is available on the network as entries in the information routing table of other nodes. Hence, when the data or service becomes available, the producers may distribute the data to subscribers effectively. There is no existing protocol that allows the producers of information to actively push the data availability information on the network to speed up the information query and discovery using ant agents. Embodiments of invention use an ant-based mechanism for nodes to actively and quickly push available information/service that it provides onto the network. The information ants directly update other nodes' information routing table entries.

This ant based propagation allows the information advertisement to reach nodes that need the information most by actively re-directing the information ants to nodes that have submitted most recent queries. Information discovery for nodes that actively consume the information/service but are not in the neighborhood of the source node is made efficient by continually re-adjusting the destination of the information ants based on the most recent queries recorded in the information routing tables of any nodes that the query ants traveled to.

The coverage of information ant distribution throughout the network may be increased by choosing the destination of the information ants as most popular nodes based on popularity measure if no query entries are found in the information routing table.

In an embodiment, query ants may be generated and forwarded opportunistically to search for available resource. An information ant may be sent in response to receiving a query ant. A popularity measure added to a lower level routing tables may facilitate query ants to travel to popular nodes with higher probability. This feature increases the effectiveness and efficiency of information query since it enables the queries to reach popular nodes faster. Node popularity is measured by how often a node is set to be the destination node of packets over a time window. The authors believe that more information exchange occurs at popular nodes. Hence, these popular nodes may provide more information and the information is updated more often.

Common routing tables are indexed by destination nodes and specify the next hop to reach each of the destination nodes. For ant-based routing algorithms, the routing table at each node may depict multiple routes for each destination node.

FIG. 10A represents a generic routing table. It will be understood that the additional entries may be stored in a separate table, like an annex table, and properly indexed into the routing table so that legacy code requiring use of the routing table is not perturbed. For each entry, there is information about how to reach the destination node. Routing table information may include the destination node 1001, the next hop nodes 1003 that a packet could be forwarded to for a given destination, probabilities 1005 of choosing a next hop node among the many choices for a given destination, the time stamp of the entry, etc. The summation of all probability entries for next hop nodes leading to the same destination node should be 1. Depending on the specific routing protocol, the actual routing table may contain a subset of the information or more than what is indicated in FIG. 10A. It will be apparent to those of skill in the art that network or node routing protocol may be enhanced by changes to additional entries to the routing table as described herein, but the original entries need not be modified.

FIG. 10B shows the popularity measure as an additional entry to the original routing table. In an embodiment, the routing table contains an additional entry 1007, for popularity measure for a destination. The popularity measure may be derived as a function of how often a node is chosen as the final destinations of packets. The authors observed that popular nodes are visited more often and therefore contain more information in the information routing tables for information/services T. The information also tends to be more up-to-date. Hence, the chance of encountering useful information is higher if query ants visit these nodes with higher probability. In order to influence query ants to visit these popular destination nodes, in an embodiment, an additional entry for each destination node may be added to the routing table. This new entry is the popularity measure 1007 of the destination node.

An example popularity measure is Counter(k, Q) 1007, which counts the number of times over the last time window size Q that node k was chosen as the final destination of packets. It will be understood that other popularity measures may be used.

Referring again to FIG. 10B, the table entry Pr{A,k} 1011 represents the probability of choosing next hop node A to reach destination node k. Query ants may be sent out by nodes that need information/services but cannot find sufficient information in the information routing table that satisfy the information/service need. In an embodiment, the query ant may use the following format:

query(D, S, T): {D||S||CTime||T||PM{S, T}||hop||permission||flag}, where

D is a destination node identity or address that provides information type T;

S is the source node identity or address that generated the query;

CTime is a query ant creation time associated with S. A batch of query ants is generated using the same CTime. Each time a new query is generated, the CTime is updated to the current time at the node;

T is the information type that describes the requested information/services;

PM{S, T} contains the capability parameters, provider reputation of information type T required by source node S;

hop is the hop count value that specifies the number of nodes the query ant has visited so far. Upon initiation, hop=0;

permission specifies whether node S authorizes the receiving node of this query ant to initiate a connection request directly to the information providing node on behalf of S; and flag specifies whether node S authorizes the receiving node of this query ant to change the destination node identity/address of the query ant.

Figure 11A:
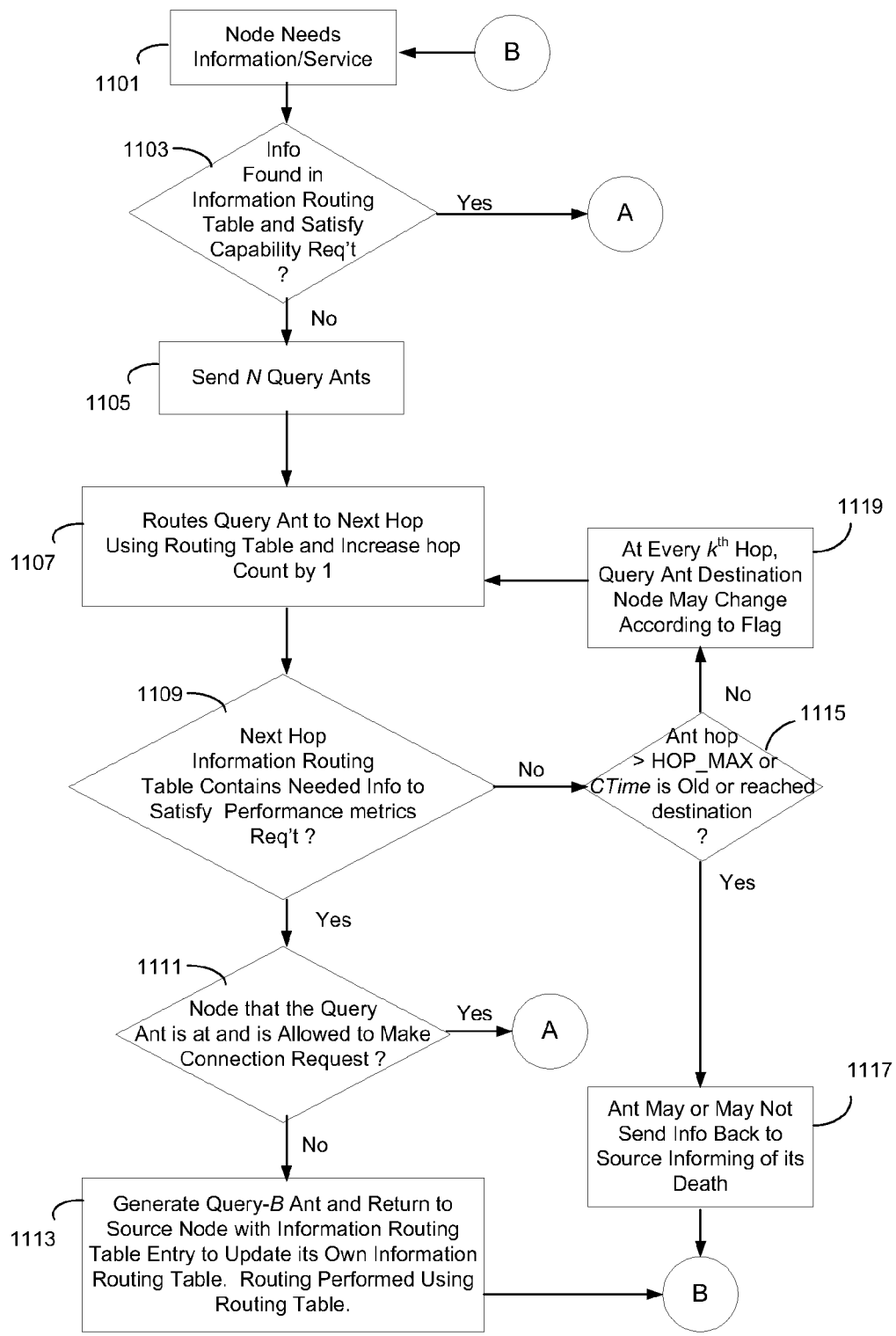
FIGS. 11A-B are a flow diagram illustrating how query ants may propagate throughout the network to search for information/service providing nodes, according to an embodiment of the invention.
Figure 11B:
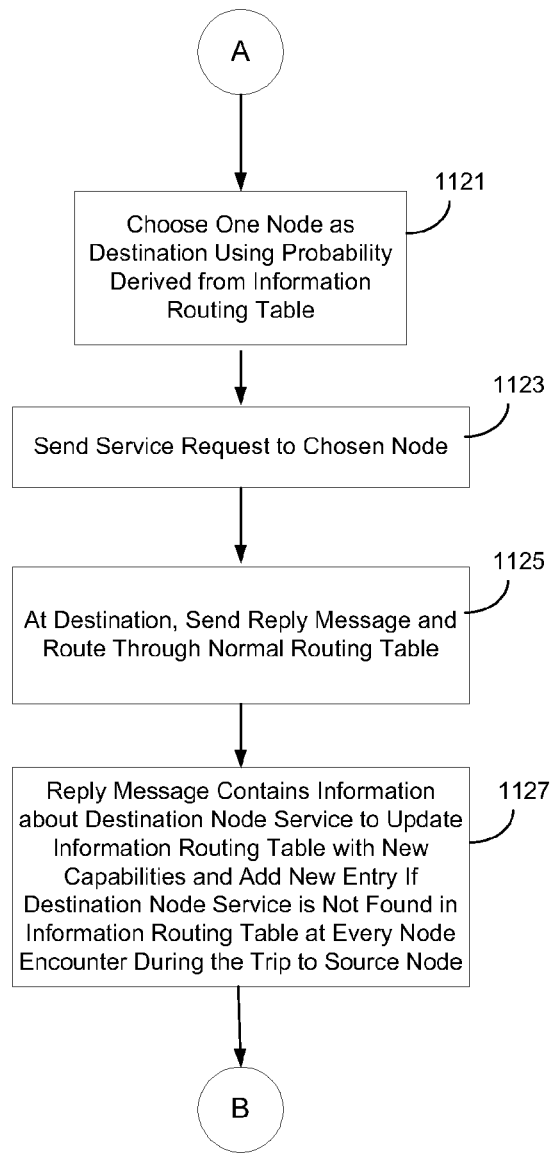

In an embodiment, when a node needs to locate where information/service type T is provided on the network, it may use the protocol as illustrated in FIGS. 11A-B. When a source node identifies the need for an information/service from another node on the network, the source node begins the process of finding the information/service providing node, in block 1101.

A determination is made first whether the source node's information routing table contains an entry for the information/service of type $T_i$ that meets the performance metric requirements, in block 1103. If so, then processing continues at block 1121, to be discussed below. Otherwise, the source node requires information from the nodes on the network and prepares to send query ants to request the required information. A number N of query ants will be sent in block 1105. The N ants may be generated using a query protocol of query($D_1$, S, T), query($D_2$, S, T), . . . , query($D_n$, S, T), where $D_1$, $D_2$, . . . , are the N most popular destinations in the source node's routing table, according to the popularity measure (1007). If there are fewer than N destinations in the routing table, the number of query ants may either be reduced, or the query ants may be sent to duplicated addresses, as discussed above with respect to information ants. The determination for sending fewer ants or duplicated address for information ants and query ants may be the same or differ, based on user preference.

The routing table of the source node is used to identify the next hop destination node, in block 1107. The query ant is then sent to the next nodes, based on the routing table and its hop count is increased by 1. Query ants may be routed through intermediate nodes on their way to their ultimate destination, e.g., a node that provides the required information or service. Upon receiving a query ant, an intermediate node will examine the hop and CTime values as part of the procedure to route the query ant to the next hop.

At the next hop, or intermediate node, a determination is made as to whether the information routing table of the intermediate node contains the requested information that satisfies the performance metric requirements requested by the query ant, in block 1109. If not, the intermediate node will discard the query ant if hop>HOP_MAX or if the CTime is old or if the intermediate node is the final destination, as determined in block 1115. This implies the query ant is too old or carries obsolete information. Thus, older or obsolete query ants will not continue to propagate throughout the network, ad infinitum. The query ant is discarded in block 1117, and in some embodiments, information is sent back to notify the source node that the query ant has been discarded.

If the query ant is still fresh, as determined in block 1115, then the query ant will be further processed by the current node and may be forwarded on to continue searching for the information/service on behalf of the source node, in block 1119. If the queried service cannot be found in the intermediate node's information routing table, the intermediate node examines the hop count value in the query ant. If hop<HOP_MAX, hop is incremented by 1 and the query ant will be forwarded to the next hop in block 1107.

In an embodiment, the destination node address may be changed within the query ant, for instance, at every $k^{th}$ hop. The value k may be initially set to a 6 or 7 based on studies on degrees of relatedness in networks. The value k may also be set as a function of the diameter of the network. The flag present in the query ant indicates whether or not the destination address is permitted to be modified by the intermediate nodes. The modified destination addresses may be changed based on popularity values for nodes in the intermediate node's routing table. Changing the destination addresses to more popular, more frequently accessed nodes, enables the query to propagate to nodes that most likely contains the needed information. A destination of the query ant may be changed according to the following procedure. The destination address of a query ant may be changed at every $k^{th}$ hop if flag=TRUE. Upon receiving a query ant query(D, S, T), the receiver node will determine if hop is a multiple of k. If flag=TRUE and hop is a multiple of k, the receiver may calculate a probability measure $P_k$ and make a decision to replace the destination node of the query ant with probability $P_k$ with the most popular destination node in the receiver's routing table. If multiple nodes with the same popularity measure are found, then in an embodiment, one destination may be randomly selected. It will be apparent to those of skill in the art that various random selection algorithms may be used. It will also be apparent that other selection criteria may be used to select the destination when a same popularity measure is found. For instance, in an embodiment, the node may be selected which has a lower (or higher) index in the list of nodes, or any other discriminating method may be used.

Figure 12:
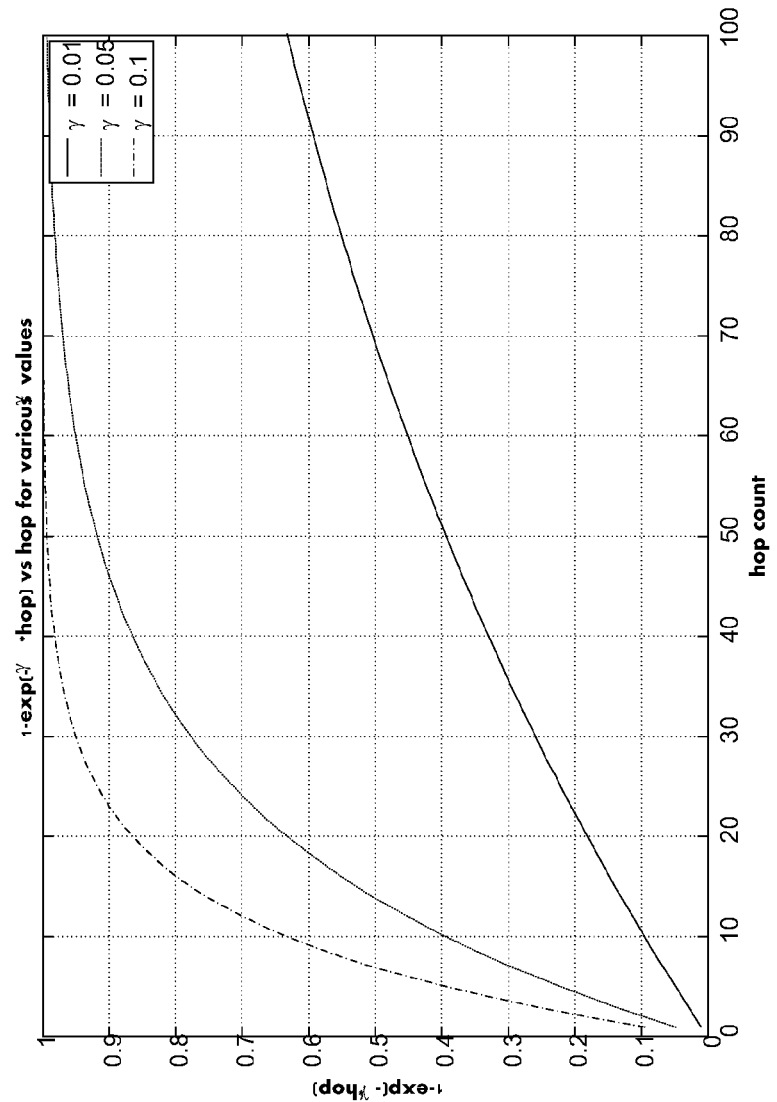
FIG. 12 is a graph illustrating the propagation of query ants to nodes in the network, based on using a probability measure for each node in the routing table, as well as using popularity measures, according to an embodiment of the invention.

Referring to FIG. 12, there is shown a graph illustrating the propagation of query ants to nodes in the network, based on using a probability measure for each node in the routing table, as well as using popularity measures, as shown in FIGS. 10A and B. By potentially changing the destination of the query ant, it may be possible to enable the query ants to explore a larger area in the network. In an embodiment, the formula for the probability measure may be implemented as a function of:

$P_k \leftarrow f(hop, counter(X, Q))$, where counter(X, Q) is the popularity measure of a chosen destination node. Thus, the probability measure may be calculated as $P_k = (1-\exp(-\gamma*hop))*(counter(X,Q)/$sum of all counter(X, Q) values in routing table).

For nodes that are near the source node, $P_k$ is low because $(1-\exp(-\gamma*hop))$ is small. Nodes that are near the source node may likely have similar popularity measures. Thus, if these intermediate nodes are permitted to change destination nodes to nearby nodes, the query ants will likely end up being routed to similar places.

Referring again to FIGS. 11A-B, in an embodiment, an intermediate node containing information for an arrived query ant may sometimes be permitted to commence a service request to connect the source node with the node that provides the information/service, as defined by the permission field in the query. If the information routing table of an intermediate node contains the needed information or service as specified by the performance metrics requirements in the query (as determined in block 1109), then a determination is made as to whether the intermediate node may initiate a connection request, in block 1111. In some cases, a secure connection may be required, so the permission flag should be FALSE in those cases. If permission is not granted, then a query-B ant, i.e., information return ant, is generated and returned to the source node with the needed information routing table information entry copied from that intermediate node, in block 1113, so that the source node may update its own information routing table and make its own connection request.

In an embodiment, the format of the query-B ant is query-B(D, S, T): {D||S||CTime||T||X_content}, where D is the selected node that provides the service/information type T;

S is the source node address containing the information/service;

X_content is the content of the entry in the information routing table of the current node; and CTime is the creation time of the corresponding query ant to which this message is in response.

The node address D returned in the query-B ant message may be randomly chosen from among many destination nodes, $D_i$ that provides information type T, as listed in the information routing table, by using the probability measure $Pr(D,T_j)^{normalized}$. The routing to the destination node D is performed using the routing table of the receiver (or current) node.

When the intermediate node is permitted to initiate a connection request, processing continues at block 1121, as shown in FIG. 11B. If more than one node fits the performance metrics requirements, then a single node of possible nodes is chosen as the destination for the service request, using the probability information in the information routing table, as discussed above. Thus, each request for services may result in a connection to a different available node, based on the probability factor. This avoids the problem where the same node is selected over and over to service requests and becomes overloaded. The service request is sent to the selected node, in block 1123.

The node receiving the service request (destination node) may send a reply message which is routed through the node's normal (legacy) routing table, in block, 1125. In an embodiment, as the reply message is routed through the network via the normal routing table protocol, the information routing table at each intermediate node is either updated or a new entry is added if the information/service is not present in the local information routing table, in block 1127.

In an embodiment, when the requesting node finds that the destination node of the information/service is unreachable, for instance when no response is received or another node informs the requesting node that the destination node is offline, and deletes the node from the routing table, the requesting node may lower the probability of information routing table entries for the unreachable node by a small amount, or to below a threshold, without removing the entry altogether. Thus, if the unreachable node is only offline for a short time, for instance, due to maintenance, the probability in the information routing table will gradually rise again, as information ants are received when the previously unreachable node comes online again. For popular or nearby nodes, many information ants may be received quickly, thus raising the probability to former levels. After adjusting the probability of the unreachable node, the requesting node will select a node for the information/service, based on the updated probability values in the information routing table. If the unreachable node stays offline for a significant period of time, probabilities associated with that node will approach zero until it comes back online or until the entry is deleted for having very old information. It is preferable to retain the information routing table information when nodes go offline, even if routing table entries have been deleted, because the node may be a popular or especially high performance node when it is online again.

In an embodiment, if the source node S does not receive any query-B ants or any service reply messages from any node within a time window $t_1$, S may generate another batch of query ants. The query ant creation time CTime may be changed to the node current time. If node S does not receive any query-B ants or service reply messages within time window $t_2$ after sending out multiple batches of query ants, where $t_2 \geq t_1$, then the information query protocol may abort.

In an embodiment, there are two time limits for the query ants, $t_1$ and $t_2$. These time limits may be initially set to default values. For instance, time limit $t_i$, for waiting for a response before sending another batch of query ants may be initially set to 700 ms. This value is based on the authors' empirical studies on TCP RTT networks. Time limit $t_2$ is the time period a node waits for a response from any sequence of query ants before canceling the query procedure completely. This time value depends on the application that uses this information routing system for searching available services. If the application can tolerate a one (1) minute delay in searching for a service, then this time value may be set to one minute. At the minimum, the application should allow more than one batch of query ants to sufficiently cover a significant amount of the network. In this case, setting $t_2$=1500 ms or 2200 ms is a good example value based on the default $t_1$ value of 700 ms.

In embodiments, the network or node administrator may change the default value for several variables based on empirical data regarding network performance, or simulation studies.

The value N, the number of query ants to be generated for each information query, may depend on urgency of need, network traffic load, etc. Conditions on when query ants are allowed to use priority queues instead of data queues may vary as well.

The value of HOP_MAX, the maximum number of hops that query ants may travel to effectively discover information without over burdening the network resource may be varied.

The Permission flag, which dictates whether a receiving node may initiate a connection request, may also be varied. The quantity of receiver nodes that may initiate a handshake to start information transfer may be varied by selectively setting the permission flag to TRUE or FALSE. In an embodiment, receiver nodes found quickly by query ants (with a small hop count) may be allowed to initiate handshake to destination node. Whereas, nodes found by older ants (with a big hop count) may not initiate handshake since it is more probable that other nodes may have already initiated a handshake.

The time windows $t_1$ and $t_2$ to allow ants to propagate the system before being refreshed or killed may be varied based on a tradeoff between increasing searching coverage and reducing overhead.

In an embodiment, the present invention is a system for information routing on a network using swarm-based intelligence, comprising: a plurality of nodes on the network, each node having a routing table stored in memory, where the memory is coupled to at least one processing unit of the node; at least one provider node of the plurality of nodes configured to provide at least one of an information and/or service or to a second node on the network; at least one consumer node of the plurality of nodes configured to consume information and/or a service of a provider node; a plurality of intermediate nodes of the plurality of nodes, wherein communication among nodes on the network is one of direct node to node communication or via at least one intermediate node, the actual route of communication among nodes being driven by the routing table residing on each node.

Each provider and consumer node in the network may further comprise: an information routing table having information identifying service and information type T to be provided by nodes on the network, a list of other nodes having interest in the services and information to be provided by nodes on the network, a probability of selecting a specific provider node to provide a service/information T; and a routing table extension corresponding to the routing table on the provider node, the routing table configured to use standard network protocols, the routing table extension comprising at least one of a popularity measure or a probability measure that a node in the routing table will be in a communication path between a current node and a destination node.

Each provider node in the network may further comprise: a service providing agent configured to send information packets, also referred to as information ants, to receiving nodes on the network, announcing availability of information/service T to be provided by the provider node, wherein receiving the information ant by a receiving node on the network triggers the receiving node to perform one of: (1) add an entry into the information routing table identifying the information/service T, the provider node address, information corresponding to capabilities of the information/service T; (2) update an existing entry in the information routing table identifying the information/service T, the provider node address, information corresponding to capabilities of the information/service T; and the receiving of the information ant also to trigger selectively forwarding the received information ant to another receiving node on the network, the forwarding based in part on freshness of the information ant and whether the receiving node is a destination node, wherein the receiving node is further configured to update the probability of selecting each provider node in the information routing table that is to provide the service/information T after adding a new entry and updating an existing entry in the information routing table.

Each consumer node may further comprise: a first service consuming agent configured to generate and send query ants to receiving nodes, each query ant to propagate the network with a request for information about a selected information/service T, wherein the intermediate nodes are configured to selectively forward the received query ant to other nodes based in part on routing table popularity or probability measures; and a second service consuming agent configured to generate and send responses to received query ants when the receiving node has the requested information.

In some embodiments, a node may be both a provide node and a consumer node. Any node in the network may be an intermediate node to forward information, query or query response ants, regardless of whether the node provide or consumes an information/service T.

In some embodiments, the information routing table may include for each information/service type $T_i$ entry in the information routing table, a list of nodes $x_i$, each node $x_i$ corresponding to a provider of where an entry corresponding to $T_i$ further comprises a capability parameter, provider reputation, last update timestamp, probability for choosing node $x_i$, and last access time stamp. In some cases, a provider reputation may not be used, but instead use only popularity, probability or capability factors are to be used for determining which nodes to access for the information/service or information forwarding. In some embodiments, any combination of these elements may be used for the determination. A combination of information in both the routing tables and information routing tables may be used when setting a destination for the information and query ants.

In some embodiments, selectively forwarding a received information ant is the result of a change in the destination node address and may be permitted only if D_type_flag of the information ant equals to P. In some embodiments, changing the destination node address may be limited to every $k^{th}$ hop during the routing.

In some embodiments, a provide node is configured to automatically initiate sending information ants to announce availability of information/services provided by the provider node, responsive to coming on-line from an off-line or shutdown state or upon changes in capability parameters, including newly added or deleted information/services. The provide node may be configured to send information ant at a predetermined interval.

In some embodiments, a consumer node may be configured to select a provider node from a list of provider nodes in the information routing table that provide the necessary capabilities. In the case where more than one provider node provides the necessary capabilities one may be selected using a probability factor to avoid over utilizing the most popular node(s). If no provider node is found in the information routing table, the consumer node may send N query ants throughout the network searching for a viable provider node of the required information/service. If no response is received within a predetermined timeout period, N more query ants may be sent.

It will be apparent to one those of skill in the art that various combinations of features, as described above, may be used to propagate information about information/services provided on the network and to store information about provider nodes corresponding to the desired information/service, as well as information about other consumer nodes that desire information about available information/services on the network in order to maximize information propagation and enhance provide node's bandwidth by occasionally using less popular nodes.

The techniques described herein are not limited to any particular hardware or software configuration; they may find applicability in any computing, consumer electronics, or processing environment. The techniques may be implemented in hardware, software, or a combination of the two.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Each program may be implemented in a high level procedural or object-oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine accessible medium having stored thereon instructions that may be used to program a processing system or other electronic device to perform the methods.

Program code, or instructions, may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, set top boxes, cellular telephones and pagers, consumer electronics devices (including DVD players, personal video recorders, personal video players, satellite receivers, stereo receivers, cable TV receivers), and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks or portions thereof may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged or some variation on the subset of elements involved. Program code may be used by or in conjunction with embedded controllers.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the scope of the invention.

What is claimed is:

1. A method comprising:
pushing information corresponding to information/service type from a provider node on a network, the provider node configured to provide information/service type to consumer nodes on the network, the pushing being responsive to at least one of (a) the provider node or new information/service corresponding to the provider node coming on-line, (b) changes in capability parameters of the provider node, (c) lack of availability of an information/service from the provider node due to the provider node going off-line or shutting down the information/service, or (d) an automatic periodic push requirement;
pulling information corresponding to information/services available on the network by consumer nodes, the pulling comprising:
sending query ants to nodes on the network, each query ant comprising a query network packet, and
receiving query response ants from nodes on the network, each query response ant comprising a query response network packet;
updating an information routing table with information received in the query response ants and information ants propagating through the network;
selectively forwarding information ants, query ants, and query response ants throughout the network, the forwarding based in part on the information routing table, and popularity measures in a routing table; and
updating the information routing table of intermediate and consumer nodes by the information in a reply message sent by a provider node after receiving a service request from a consumer node.

2. The method as recited in claim 1, wherein the information routing table comprises information identifying information/service type to be provided by provider nodes on the network, a list of other nodes having interest in the services and information to be provided by nodes on the network, a probability of selecting a specific provider node to provide an information/service type.

3. The method as recited in claim 2, wherein the routing table is configured to use standard network protocols and comprises at least one of a popularity measure or a probability measure that a node in the routing table will be in a communication path between the consumer node and a destination node.

4. The method as recited in claim 1, further comprising:
selectively changing a destination address in a pushed information ant to a new destination address, the new destination address selected based on at least one of consumer node interest and node popularity.

5. The method as recited in claim 1, further comprising discarding old and obsolete received information and query ants.

6. The method as recited in claim 1, wherein updating an information routing table further comprises:
  updating probabilities associated with nodes corresponding to the information/service type associated with the received query response ants and information ants;
  updating probabilities associated with nodes corresponding to the information/service type associated with a reply message sent by a provider node in response to a service request from another node.

7. A non-transitory, computer readable storage medium having instructions stored therein that when executed on a machine, cause the machine to:
  push information ants corresponding to information/service type from a provider node on a network, the provider node configured to provide information/service type to consumer nodes on the network, each information ant comprising an information network packet, the pushing being responsive to at least one of (a) the provider node or new information/service corresponding to the provider node coming on-line, (b) changes in capability parameters of the provider node, (c) lack of availability of an information/service from the provider node due to provider node going off-line or information/service shut down, or (d) an automatic periodic push requirement;
  pull information corresponding to information/services available on the network by consumer nodes, the pulling comprising:
    send query ants to nodes on the network, each query ant comprising a query network packet, and
    receive query response ants from nodes on the network, each query response ant comprising a query response network packet;
  update an information routing table with information received in the query response ants and information ants propagating through the network; and
  selectively forward information ants, query ants, and query response ants throughout the network, the forwarding based in part on the information routing table, and popularity measures in a routing table; and
  update the information routing table of intermediate and consumer nodes by the information in a reply message sent by a provider node after receiving a service request from a consumer node.

8. The medium as recited in claim 7, wherein the information routing table comprises information identifying information/service type to be provided by provider nodes on the network, a list of other nodes having interest in the services and information to be provided by nodes on the network, a probability of selecting a specific provider node to provide an information/service type.

9. The medium as recited in claim 8, wherein the routing table is configured to use standard network protocols and comprises at least one of a popularity measure or a probability measure that a node in the routing table will be in a communication path between the consumer node and a destination node.

10. The medium as recited in claim 7, further comprising instructions to: selectively change a destination address in a pushed information ant to a new destination address, the new destination address selected based on at least one of consumer node interest and node popularity.

11. The medium as recited in claim 7, further comprising instructions to discard old and obsolete received information and query ants.

12. The medium as recited in claim 7, wherein updating an information routing table further comprises instructions to:
  update probabilities associated with nodes corresponding to the information/service type associated with the received query ants, query response ants and information ants;
  updating probabilities associated with nodes corresponding to the information/service type associated with a received reply message sent by a provider node in response to a service request from another node.

13. A provider node of a network, the provider node comprising:
  at least one processor unit coupled to a memory;
  a service providing agent to push information corresponding to information/service type from the provider node, the provider node configured to provide information/service type to consumer nodes on the network, the pushing being responsive to at least one of (a) the provider node or new information/service corresponding to the provider node coming on-line, (b) changes in capability parameters of the provider node, (c) lack of availability of an information/service from the provider node due to the provider node going off-line or shutting down the information/service, or (d) an automatic periodic push requirement;
  a service consuming agent to (i) send query ants to nodes on the network, each query ant comprising a query network packet, (ii) receive query response ants from nodes on the network, each query response ant comprising a query response network packet;
  an information routing table stored in the memory, wherein the provider node is to update the information routing table with information received in the query response ants and information ants propagating through the network;
  a routing table stored in the memory, wherein the provider node is to selectively forward information ants, query ants, and query response ants throughout the network, the forwarding based in part on the information routing table, and popularity measures in a routing table,
  wherein a reply message sent by the provider node after receiving a service request from a consumer node causes the information routing table of intermediate and consumer nodes of the network to be updated by the information in the reply message.

14. The provider node as recited in claim 13, wherein the information routing table comprises information identifying information/service type to be provided by provider nodes on the network, a list of other nodes having interest in the services and information to be provided by nodes on the network, a probability of selecting a specific provider node to provide an information/service type.

15. The provider node as recited in claim 14, wherein the routing table is configured to use standard network protocols and comprises at least one of a popularity measure or a probability measure that a node in the routing table will be in a communication path between the consumer node and a destination node.

16. The provider node as recited in claim 13, wherein the service providing agent is to push the information using an information ant, the information ant having a destination address that is selectively changeable a new destination address, the new destination address selected based on at least one of consumer node interest and node popularity.

17. The provider node as recited in claim 13, wherein the service consuming agent is to discard old and obsolete received information and query ants.

18. The provider node as recited in claim 13, wherein to update the information routing table further comprises to:
  update probabilities associated with nodes corresponding to the information/service type associated with the received query response ants and information ants, and
  update probabilities associated with nodes corresponding to the information/service type associated with a reply message sent by a different provider node in response to a service request from another node.

* * * * *